April 26, 1949.  E. D. GREEN  2,468,365
ARMATURE WINDING MACHINE
Filed Aug. 23, 1946  3 Sheets-Sheet 1
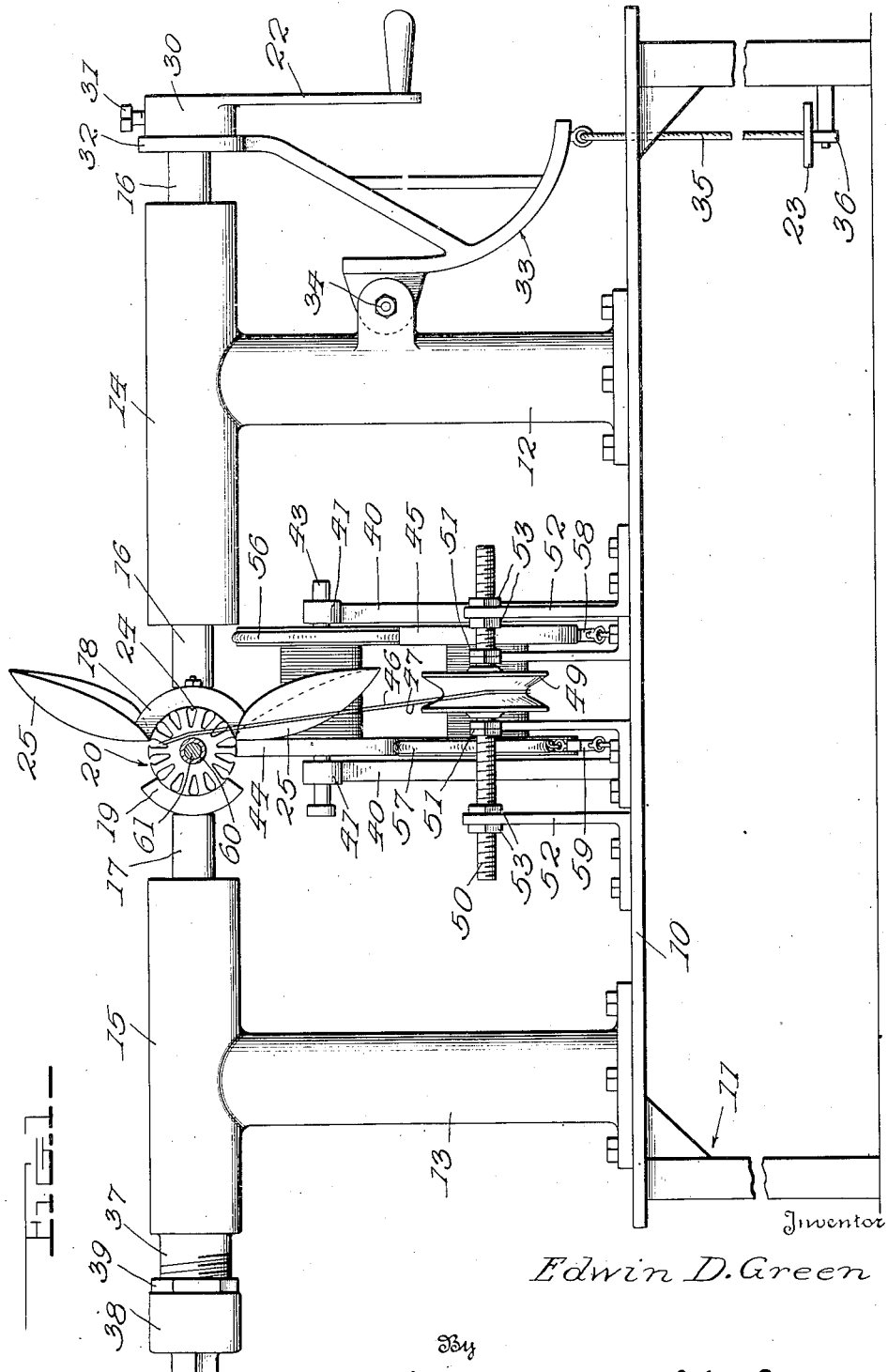
Inventor
Edwin D. Green
By
H.B. Wilson & Co. Attorney April 26, 1949.  E. D. GREEN  2,468,365
ARMATURE WINDING MACHINE
Filed Aug. 23, 1946  3 Sheets-Sheet 2
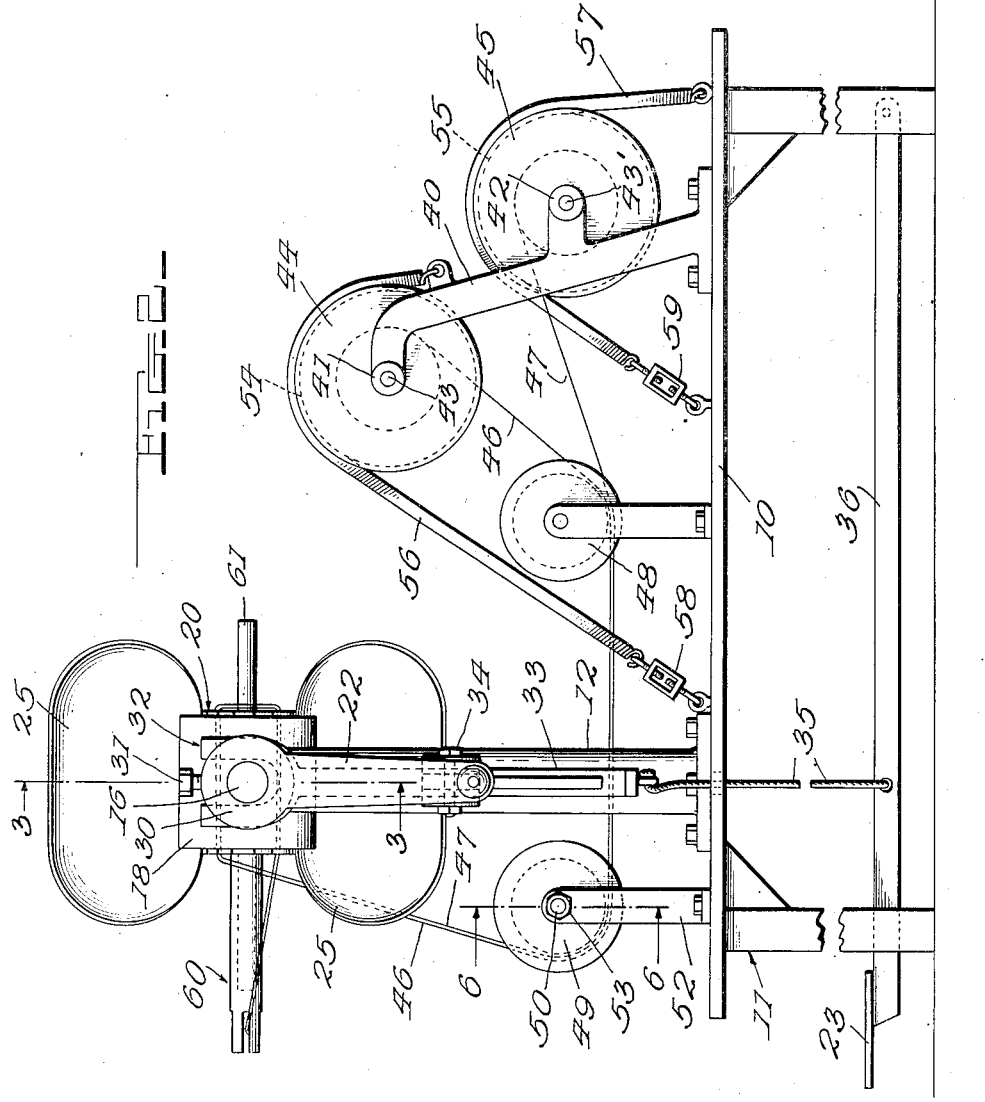
Inventor
Edwin D. Green
By
H. B. Willson & Co. Attorney

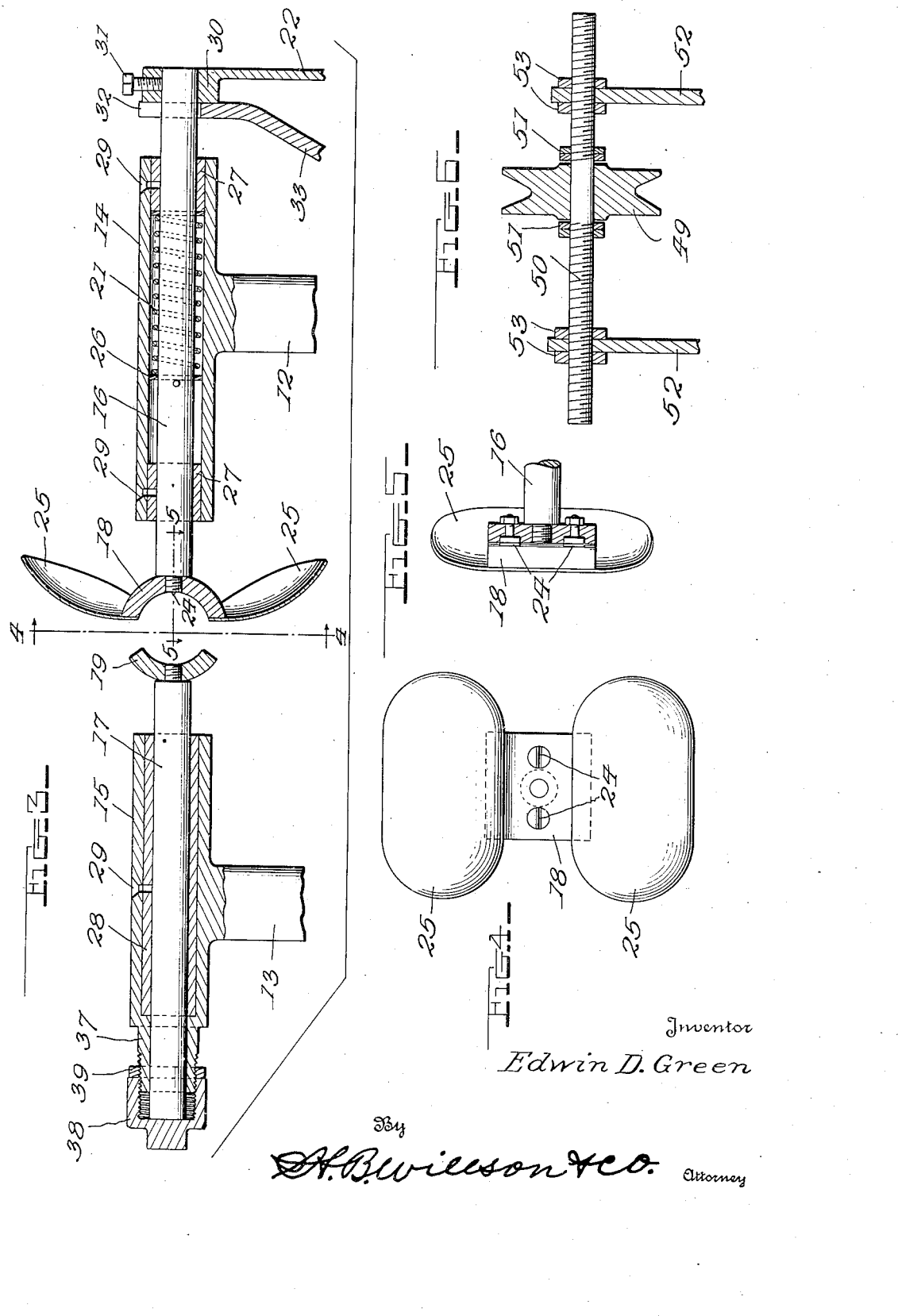

Patented Apr. 26, 1949

2,468,365

UNITED STATES PATENT OFFICE 2,468,365

ARMATURE WINDING MACHINE

Edwin D. Green, Hutchinson, Kans.

Application August 23, 1946, Serial No. 692,530

2 Claims. (Cl. 242—13)

The invention aims to provide an exceptionally simple and inexpensive, yet a highly efficient machine which may be easily and rapidly operated manually to wind the coils of armatures in the armature slots, the machine being particularly adapted for use in rewinding burned-out armatures of automobile generators and starters.

Figure 1 of the accompanying drawings is a front elevation, partly in section, showing the machine in operation.

Fig. 2 is an end elevation as viewed from the right of Fig. 1.

Fig. 3 is a detail vertical longitudinal sectional view on line 3—3 of Fig. 2.

Fig. 4 is an elevation of one of the armature holding seats and its wire-guiding wings, as indicated by line 4—4 of Fig. 3.

Fig. 5 is a detail horizontal section on line 5—5 of Fig. 3.

Fig. 6 is a detail vertical section on line 6—6 of Fig. 2.

In the drawings above briefly described, a preferred construction has been illustrated and while that construction will be rather specifically described, minor variations may of course be made within the scope of the invention as claimed.

A horizontal base 10 is shown, which may well be the top of a table or bench 11. Suitably secured to and projecting upwardly from this base, are two posts 12 and 13 upon which two horizontal bearings 14 and 15 are mounted in axial alinement. One shaft 16 is mounted in the bearing 14 for rotation and axial sliding, and another shaft 17 is rotatably mounted in the bearing 15, this shaft 17 being normally held against axial shifting. The inner end of the shaft 16 is provided with an arcuate armature seat 18 and a similar seat 19 is provided on the inner end of the shaft 17, said seats being cooperative in holding an armature 20 to be wound. The shaft 16 and seat 18 are urged toward the shaft 17 and seat 19 by means of a coiled compression spring 21 to grip the armature 20 and said shaft 16 is equipped with a hand-crank 22 by means of which it may be rotated the desired number of turns to complete any coil, and then stopped. The shaft 16 is then shifted away from the shaft 17 by means of a foot pedal 23, to release the armature 20 sufficiently to permit it to be turned to properly position the next pair of slots to receive their respective windings. The seat 18 is provided with two ribs 24 for successive reception in the armature slots to properly position the latter, and said seat 18 also carries two substantially elliptical wings 25 to guide the wires into said slots.

The spring 21 is confined within the bearing 14 and thrusts against a collar or the like 26 on the shaft 16. The spring reacts against a suitable abutment which may well be one of a pair of bushings 27 in said bearing 14. A bushing 28 is preferably included also in the bearing 15, and both bearings have appropriate oil holes 29.

The hand crank 22 has a hub or collar 30 secured on the outer end of the shaft 16 by a set screw or the like 31. The forked end 32 of a suitable lever 33 is cooperable with this hub or collar 30 to axially slide the shaft 16 in armature-releasing direction when the pedal 23 is depressed. The lever 33 is suitably mounted at 34 upon the posts 12 and is connected by a cable or the like 35 with a lever 36 carrying the pedal 23. When this pedal is depressed, the shaft 16 is shifted away from the shaft 17 to permit placing of an armature between the two seats 18, and when the pedal is released, the spring 21 forces shaft 16 again inwardly to cause the two seats 18 and 19 to grip said armature. Also, after the coil has been wound in one pair of armature slots and the next pair is to be presented for wire reception, slight depression of the foot pedal will release the armature sufficiently to permit it to be turned to the proper position by hand, and the armature will be held against slipping from any of its proper winding positions by means of the ribs 24.

In the present showing, the outer end of the bearing 15 has a reduced extension 37 upon which a cap 38 is threaded adjustably, a lock nut 39 being shown for said cap. By loosening this lock nut and turning the cap 38 in the proper direction, the shaft 17 may be adjusted toward the shaft 16. This lessens the distance which the spring 21 must move the shaft 16 in order to grip the armature, and consequently increases the grip upon said armature, should this be necessary. It is inadvisable, however, to grip the armature with more force than necessary, due to the added power necessary to retract the shaft 16 against the spring 21 and the consequent additional wear on the shaft-shifting elements. After the cap 38 has been adjusted, the lock nut 39 is of course tightened to maintain that adjustment.

Two posts 40 are secured to and rise from the rear portion of the base 10, said posts having upper and lower bearings 41 and 42 to receive shafts 43 and 43' upon which the spools 44 and 45 are rotatably mounted. One of these spools carries the usual colored wire 46 and the other carries the usual white tracer wire 47. Friction brake means are provided for the two spools, and two sheaves 48 and 49 are employed to guide the wires from the spools to the armature 20, and the sheave 49 is so located that the wires must extend upwardly from this sheave in range of the wings 25, as shown in Figs. 1 and 2. The inner edges of these wings are located truly along one side of the armature slots to receive the windings, and as the shaft 16 is rotated, said wings guide the wires into the slots with precision. Whenever the cap 38 is adjusted to vary the distance which the spring 21 will force the armature seat toward the left, it may be advisable to similarly adjust the sheave 49, and provision is, therefore, made for this purpose. In the present disclosure, the sheave 49 is rotatably mounted upon the intermediate portion of a shaft 50, between appropriate collars 51. This shaft is threaded through the upper ends of two posts 52 which are secured to the base 10, and locknuts 53 are provided. This construction permits axial adjustment of the sheave 49 as desired.

One end flange of the spool 44 is formed with a peripheral groove 54, and another groove 55 is formed in one end flange of the spool 45. Two coiled tension springs 56 and 57 are engaged with these grooves respectively, and have their ends suitably anchored, whereby said springs form effective friction brakes for giving the desired resistance to unwinding of the wires. Turn-buckles 58 and 59 are preferably provided, whereby the tension of the springs may be adjusted as required.

From the foregoing, taken in connection with the accompanying drawings, it will be seen that a novel and advantageous construction has been provided for easily and rapidly winding armatures. The winding operations are preferably performed with the aid of a slotted sleeve 60 slipped onto one end of the armature shaft 61. At the start of No. 1 winding and after the completion of any other winding, the wires are engaged with the slots of the sleeve, providing for ample lengths of wire to be later cut and connected in the usual way with the commutator segments.

While preferences have been disclosed, attention is again invited to the possibility of making variations within the scope of the invention as claimed.

I claim:

1. An armature winder comprising a base, two axially alined horizontal bearings over said base, means rigidly mounting said bearings on said base, one shaft rotatable and axially shiftable in one of said bearings, a second shaft rotatable in the other of said bearings and normally held against axial shifting, armature seats on the inner ends of said shafts, spring means associated with said one shaft for axially shifting it toward said second shaft to cause gripping of an armature by said seats, a hand crank on said one shaft for rotating it to wind the coils of wire in the armature slots, guide wings on one of said seats for guiding the wires into the armature slots, means on the rear portion of said base for supporting spools of wire, friction brake means for said spools to tension the wires, means on said base for guiding the wires from said spools to the armature, including a sheave under which the wires extend forwardly and from which the wires extend upwardly to the armature within range of said wings, foot-actuated means for axially sliding said one shaft against the action of said spring means when the armature is to be turned about its own axis after winding any coil, means on one of said armature seats for successive reception in the armature slots to hold the armature against accidental turning about its own axis, thrust means associated with the bearing of said second shaft for adjusting said second shaft toward said one shaft to decrease the distance which said spring means must shift said one shaft and thereby increase the grip on the armature when desired, and means for adjusting said sheave in the same direction to keep the upwardly extending reaches of the wires in proper relation with said wings.

2. In an armature winder, two axially alined bearings, one shaft rotatable and axially shiftable in one of said bearings, a second shaft rotatable and axially shiftable in the other of said bearings, armature seats on the inner ends of said shafts and having wings for guiding the wires into the armature slots, spring means for axially shifting said one shaft toward said second shaft to cause gripping of an armature by said seats, thrust means associated with the bearing of said second shaft for adjusting this shaft toward said one shaft to decrease the distance which said spring means must shift said one shaft and thereby increase the grip on the armature when desired, means whereby said one shaft may be shifted away from said second shaft, means whereby one of said shafts may be driven, a sheave from which the wires extend upwardly to the armature, and means for adjusting said sheave in the same direction in which said second shaft is adjusted, to keep the wires in proper relation with said wings.

EDWIN D. GREEN.

REFERENCES CITED

The following references are of record in the file of this patent:

UNITED STATES PATENTS

| Number | Name | Date |
| --- | --- | --- |
| 1,289,318 | Van Deven | Dec. 31, 1918 |
| 1,462,604 | Lavalle | July 24, 1923 |
| 1,609,929 | Carter et al. | Dec. 17, 1926 |
| 1,667,070 | Jones et al. | Apr. 24, 1928 |
| 1,969,734 | Eaton | Aug. 14, 1934 |
| 1,994,254 | Probst | Mar. 12, 1935 |

FOREIGN PATENTS

| Number | Country | Date |
| --- | --- | --- |
| 350,328 | Germany | Mar. 17, 1922 |